(12) United States Patent
Cao

(10) Patent No.: US 10,007,377 B2
(45) Date of Patent: Jun. 26, 2018

(54) INTEGRATED TOUCH CONTROL DISPLAY PANEL AND TOUCH DISPLAY DEVICE

(71) Applicants: Shanghai Tianma Micro-electronics Co., Ltd., Shanghai (CN); Tianma Micro-electronics Co., Ltd., Shenzhen (CN)

(72) Inventor: Zhaokeng Cao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 85 days.

(21) Appl. No.: 15/146,360

(22) Filed: May 4, 2016

(65) Prior Publication Data

US 2017/0160857 A1 Jun. 8, 2017

(30) Foreign Application Priority Data

Dec. 7, 2015 (CN) .......................... 2015 1 0895174

(51) Int. Cl.
G06F 3/041 (2006.01)
G06F 3/044 (2006.01)

(52) U.S. Cl.
CPC ............ G06F 3/0416 (2013.01); G06F 3/044 (2013.01); G06F 3/0412 (2013.01)

(58) Field of Classification Search
CPC ....... G06F 3/044; G06F 3/0412; G06F 3/0416
See application file for complete search history.

(56) References Cited

U.S. PATENT DOCUMENTS

| | | | |
|---|---|---|---|
| 2014/0375606 A1* | 12/2014 | Abe ..................... | G02F 1/13338 345/174 |
| 2016/0370897 A1* | 12/2016 | Zhao ....................... | G06F 3/044 |
| 2017/0285827 A1* | 10/2017 | Azumi .................. | G06F 3/0412 |

FOREIGN PATENT DOCUMENTS

| | | |
|---|---|---|
| CN | 1940682 A | 4/2007 |
| CN | 101866228 A | 10/2010 |
| CN | 102955636 A | 3/2013 |
| CN | 103529577 A | 1/2014 |
| CN | 104461209 A | 3/2015 |
| CN | 104516141 A | 4/2015 |
| CN | 205581455 U | 9/2016 |
| JP | 2011100326 A | 5/2011 |

* cited by examiner

*Primary Examiner* — Lixi C Simpson
(74) *Attorney, Agent, or Firm* — Anova Law Group, PLLC

(57) ABSTRACT

The present disclosure provides an integrated touch control display panel. The integrated touch control display panel includes a plurality of stripe-shaped common electrodes sequentially arranged in a first direction and extending in a second direction intersecting with the first direction. The stripe-shaped common electrodes operate as touch control driving electrodes during a touch control phase. At least two stripe-shaped common electrodes have an equal on-state resistance in the second direction and an equal aggregated parasitic capacitance during a touch control phase.

13 Claims, 11 Drawing Sheets

INTEGRATED TOUCH CONTROL DISPLAY PANEL AND TOUCH DISPLAY DEVICE

CROSS-REFERENCES TO RELATED APPLICATIONS

This application claims the priority of Chinese Patent Application No. CN201510895174.3, filed on Dec. 7, 2015, the entire contents of which are incorporated herein by reference.

FIELD OF THE DISCLOSURE

The present disclosure generally relates to the touch control technologies and, more particularly, relates to an integrated touch control display panel and a touch display device.

BACKGROUND

With the advancement of modern electronic technologies, the display panel of display device may incorporate additional structures to support more functions. For example, touch control structure may be incorporated to support touch control function to provide users with application convenience.

Currently, to reduce the thickness of display panel and support touch control function at the same time, touch control structure is often integrated into display panel. When the capacitive touch control structure is used, the touch control electrodes of the capacitive touch control structure may be directly formed on the same substrate as display structure. However, such configuration may cause certain issues.

According to the present disclosure, control circuits of the display panel may include functional modules such as signal amplifiers and analog-to-digital and digital-to-analog converters. When the touch control driving signals are received and processed by those functional modules, distortions may occur. That is, the detected values of the touch driving signals may differ from the actual values of the touch driving signals. When the received touch control driving signals are processed, the control circuits (for example, the integrated circuit) may include additional noise detection processing to precisely extract the touch control position. Such approach may increase the power consumption of the control circuit and slow down the processing speed.

The disclosed integrated touch control display panel and touch display device are directed to solve one or more problems in the art.

BRIEF SUMMARY OF THE DISCLOSURE

Directed to solve one or more problems set forth above and other problems in the art, the present disclosure provides an integrated touch control display panel and a touch display device.

One aspect of the present disclosure includes an integrated touch control display panel. The integrated touch control display panel includes a plurality of stripe-shaped common electrodes sequentially arranged in a first direction and extending in a second direction intersecting with the first direction. The stripe-shaped common electrodes operate as touch control driving electrodes during a touch control phase. At least two stripe-shaped common electrodes have an equal on-state resistance in the second direction and an equal aggregated parasitic capacitance during a touch control phase.

Another aspect of the present disclosure includes a touch display device. The touch display device includes the disclosed integrated touch control display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
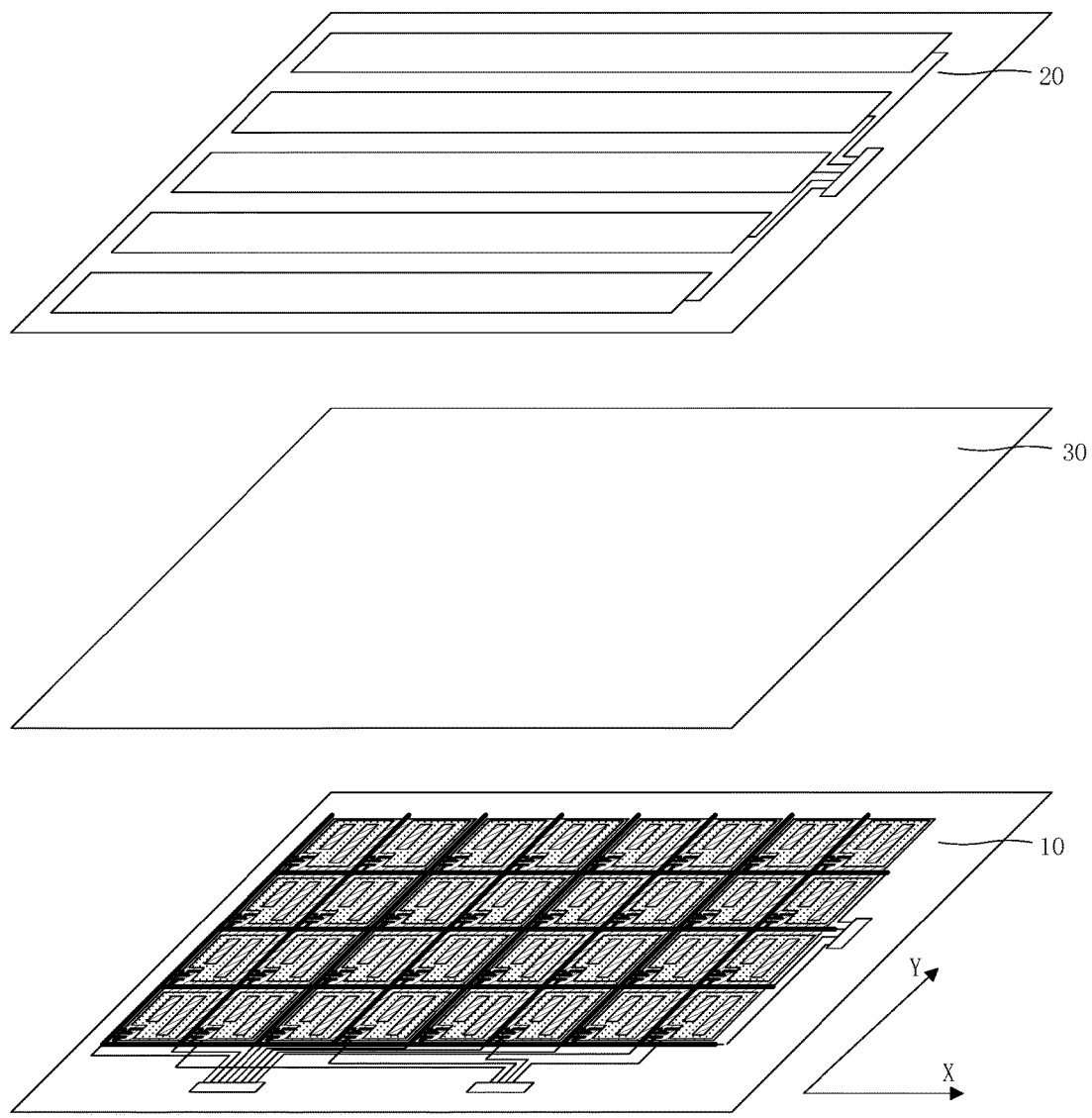
FIG. 1 illustrates a schematic view of an exemplary integrated touch control display panel according to the disclosed embodiments.

FIG. 1 illustrates a schematic view of an exemplary integrated touch control display panel according to the present disclosure. Referring to FIG. 1, the integrated touch control display panel may include an array substrate 10, a counter substrate 20 configured facing toward the array substrate 10, and a liquid crystal layer 30 sandwiched between the array substrate 10 and the counter substrate 20. The array substrate 10 may be bonded with the counter substrate 20 by a sealant frame.

Figure 2:
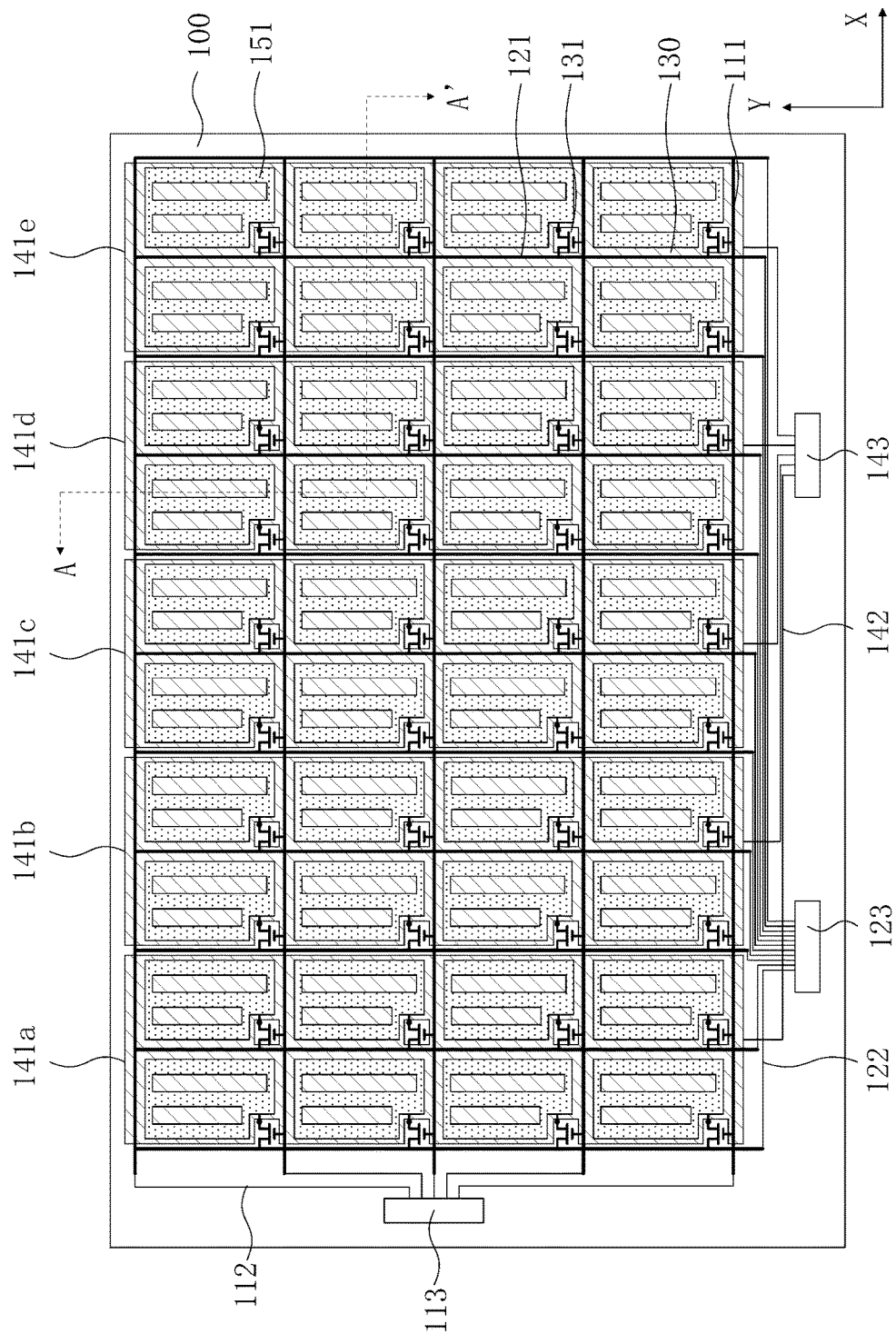
FIG. 2 illustrates a top view of the array substrate in FIG. 1.
Figure 3:
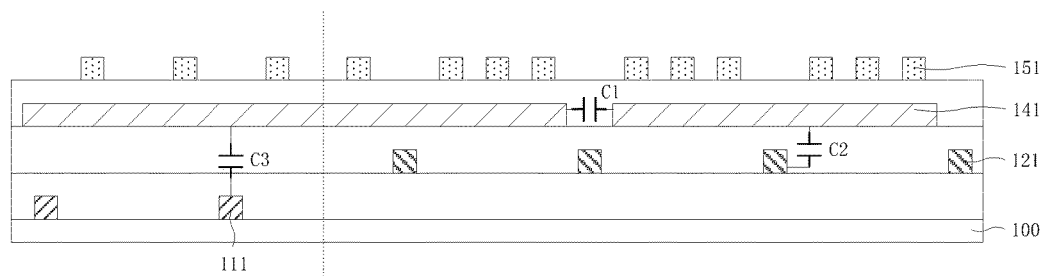
FIG. 3 illustrates a cross-sectional view along the AA' line in FIG. 2.
Figure 4:
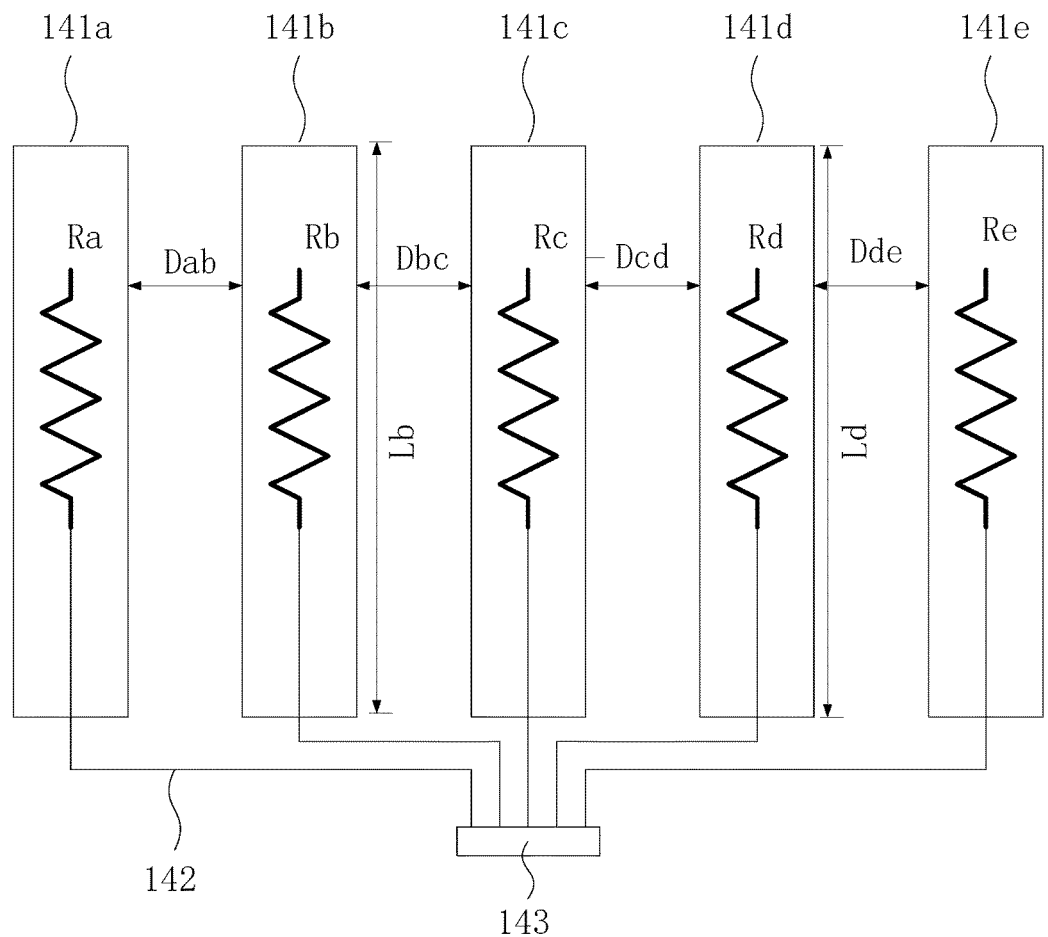
FIG. 4 illustrates an equivalent schematic view of an exemplary common electrode during the touch control phase.

The array substrate 10 may be illustrated from various perspectives in FIGS. 1-4. FIG. 2 illustrates a top view of the array substrate in FIG. 1. FIG. 3 illustrates a cross-sectional view along the AA' line in FIG. 2. FIG. 4 illustrates an equivalent schematic view of an exemplary common electrode during the touch control phase.

Referring to FIGS. 2-3, the integrated touch control display panel according to the present disclosure may include an array substrate 10. The array substrate 10 may include a substrate 100. A plurality of scanning lines 111 and a plurality of data lines 121 may be configured on the substrate 100. The scanning lines 111 may extend in a first direction X. The data lines 121 may extend in a second direction Y. Two adjacent scanning lines 111 may intersect with two adjacent data lines 121 to form a pixel unit 130. The first direction X may be perpendicular to the second direction Y.

The array substrate 10 may include a plurality of stripe-shaped common electrodes 141. The stripe-shaped common electrodes 141 may extend in the second direction Y and may be sequentially arranged in the first direction X. During the touch control phase, the stripe-shaped common electrodes 141 may operate as touch control driving electrodes. At least two stripe-shaped common electrodes 141 may have equal on-state resistance in the second direction Y, and equal parasitic capacitance during the touch control phase. The parasitic capacitance may include a parasitic capacitance C1 between adjacent stripe-shaped common electrodes 141, a parasitic capacitance C2 between the stripe shaped common electrode 141 and the data line 121, and a parasitic capacitance C3 between the stripe shape common electrode 141 and the scanning line 111.

Specifically, in one embodiment, as shown in FIG. 2, only a 10×4 matrix of the pixel units 130 may be used for illustration purposes. Other size matrixes of the pixel units 130 may be used in the product design. The extension direction of the scanning lines 111 in the first direction X may indicate that the overall extension direction is parallel with the first direction X while the individual sections of the scanning lines 111 may be bent. Similarly, the extension direction of the data lines 121 in the second direction Y may indicate that the overall extension direction is parallel with the second direction Y while the individual sections of the data lines 121 may be bent.

For example, the dual-domain in-plane switching (IPS) display panels may include bent pixel electrodes and/or common electrodes to improve the viewing angles. In this case, the data lines may often bend accordingly. However, the extension direction of the data lines may still be perpendicular to the extension direction of the scanning lines. The data lines 121 shown in FIGS. 2-3 are straight. In certain other embodiments, the data lines 121 may be bent.

Two adjacent data lines 121 and two adjacent scanning lines 111 may intersect to define a pixel unit 130. Each pixel unit 130 may include a thin film transistor 131. The thin film transistor 131 may be an amorphous silicon thin film transistor or a poly-silicon thin film transistor. The thin film transistor 131 may be configured near the junction of the data line 121 and the scanning line 111. The thin film transistor 131 may have the gate electrode electrically connected to a scanning line 111, the source electrode electrically connected to a data line 121, and the drain electrode electrically connected to a pixel electrode 151. When the corresponding scanning line turns on, the signal from the data line 121 may be transmitted to the pixel electrode 151. In one embodiment, the pixel electrodes 151 may include a plurality of stripe-shaped electrodes.

The plurality of the stripe-shaped common electrodes 141 may extend in the second direction Y. Referring to FIGS. 3-4, five stripe-shaped common electrodes 141a, 141b, 141c, 141d and 141e may extend in the second direction Y. Each stripe-shaped common electrode 141 may be configured to support two columns of the pixel units 130. In certain other embodiments, other configurations of the stripe-shaped common electrodes 141 and the pixel units 130 may be used. For example, each stripe-shaped common electrode may be configured to support multiple columns of the pixel units.

Similar to the data lines 121, the extension direction of the stripe-shaped common electrodes 141 in the second direction Y may indicate the overall extension direction while each stripe-shaped common electrode 141 may be bent to accommodate the pixel unit configuration in the display panel of the actual display products. The plurality of the stripe-shaped common electrode 141 may be sequentially arranged in the first direction X.

Referring to FIG. 2, in one embodiment, the plurality of the scanning lines 111 may be connected to the scanning driver circuit 113 through the scanning connection lines 112. The plurality of the data lines 121 may be connected to the data driver circuit 123 through the data connection lines 122. The plurality of the stripe-shaped common electrodes 141 may be connected to the common electrode driver circuit 143 through the common electrode connection lines 142.

The scanning driver circuit or the gate electrode driver circuit 113 may be an integrated circuit (IC) or an amorphous silicon driver circuit. Other appropriate types of circuits may be used. During the image display phase, the common electrode driver circuit 141 may supply common electrode signals to the plurality of the stripe-shaped common electrodes 141. The stripe-shaped common electrodes 141 and the pixel electrodes 151 may form electric fields to rotate the liquid crystals to display images. During the touch control phase, the plurality of the stripe-shaped common electrodes 141 may operate as touch control driving electrodes. The common electrode driver circuit 143 may supply touch control signals to the stripe-shaped common electrodes 141.

In one embodiment, at least two stripe-shaped common electrodes 141 may have equal on-state resistance in the second direction Y. The stripe-shaped common electrodes 141b and 141d shown in FIG. 2 may be used for illustration. Out of five stripe-shaped common electrodes 141a, 141b, 141c, 141d and 141e, two stripe-shaped common electrodes 141b and 141d may have the equal on-state resistance in the second direction Y. That is, the on-state resistance is the same in the signal transmission direction.

Referring to FIG. 4, the five stripe-shaped common electrodes 141a, 141b, 141c, 141d and 141e may have on-state resistances Ra, Rb, Rc, Rd and Re, respectively, in the second direction Y. The two stripe-shaped common electrodes 141b and 141d may have the equal on-state resistances Rb and Rd. When the two stripe-shaped common electrodes 141b and 141d have the equal on-state resistance in the signal transmission direction, the touch control signals transmitted on the two stripe-shaped common electrodes 141b and 141d may have equal unit voltage drop and equal signal loss. Thus, the signal distortion due to different on-state resistances in the signal transmission direction may be eliminated.

Further, at least two stripe-shaped common electrodes may have equal parasitic capacitance during the touch control phase. For example, the stripe-shaped common electrodes 141b and 141d may have the equal parasitic capacitance during the touch control phase. The parasitic capacitance may include a parasitic capacitance C1 between adjacent stripe-shaped common electrodes 141, a parasitic capacitance C2 between the strip shaped common electrode 141 and the data line 121, and a parasitic capacitance C3 between the stripe shape common electrode 141 and the scanning line 111.

Referring to FIGS. 3-4, for example, the parasitic capacitance Cb of the stripe-shaped common electrode 141b may include a parasitic capacitance C1ab between the stripe-shaped common electrode 141a and the stripe-shaped common electrode 141b, a parasitic capacitance C1bc between the stripe-shaped common electrode 141b and the stripe-shaped common electrode 141c, a parasitic capacitance C2b between the strip shaped common electrode 141b and the data line 121, and a parasitic capacitance C3b between the stripe shape common electrode 141b and the scanning line 111. That is, $$Cb=C1ab+C1bc+C2b+C3b.$$

The parasitic capacitance Cd of the stripe-shaped common electrode 141d may include a parasitic capacitance C1cd between the stripe-shaped common electrode 141c and the stripe-shaped common electrode 141d, a parasitic capacitance C1de between the stripe-shaped common electrode 141d and the stripe-shaped common electrode 141e, a parasitic capacitance C2d between the strip shaped common electrode 141d and the data line 121, and a parasitic capacitance C3d between the stripe shape common electrode 141d and the scanning line 111. That is, $$Cd=C1cd+C1de+C2d+C3d.$$

When Cb=Cd, the stripe-shaped common electrodes 141b and 141d may have equal total parasitic capacitance. During the touch control phase, the stripe-shaped common electrodes 141b and 141d may have equal amount of signal phase shift to eliminate the signal distortion due to different parasitic capacitances. Thus, the precise touch control position may be calculated during the touch control phase.

The integrated touch control display panel according to the present disclosure may include at least two stripe-shaped common electrodes configured to have equal on-state resistance in the signal transmission direction to have equal unit voltage drop and signal loss of the touch control signals, and equal parasitic capacitance during the touch control phase to have equal signal phase shift of the touch control signals. Thus, the additional noise detection processing by the control circuit may be reduced, the power consumption of the control circuit may be reduced, and the processing speed of the control circuit may be increased.

Further, other stripe-shaped common electrodes 141 except for the two outermost stripe-shaped common electrodes 141 may be configured to have equal on-state resistance in the second direction Y, and equal parasitic capacitance during the touch control phase.

Referring to FIG. 4, the stripe-shaped common electrode 141a may have the on-state resistance Ra and the parasitic capacitance Ca. The parasitic capacitance Ca of the stripe-shaped common electrode 141a may include a parasitic capacitance C1ab between the stripe-shaped common electrode 141a and the stripe-shaped common electrode 141b, a parasitic capacitance C2a between the strip shaped common electrode 141a and the data line 121, and a parasitic capacitance C3a between the stripe shape common electrode 141a and the scanning line 111. That is, $$Ca=C1ab+C2a+C3a.$$

Similarly, the stripe-shaped common electrode 141c may have the on-state resistance Rc and the parasitic capacitance Cc. The parasitic capacitance Cc of the stripe-shaped common electrode 141c may include a parasitic capacitance C1bc between the stripe-shaped common electrode 141b and the stripe-shaped common electrode 141c, a parasitic capacitance C1cd between the stripe-shaped common electrode 141c and the stripe-shaped common electrode 141d, a parasitic capacitance C2c between the strip shaped common electrode 141c and the data line 121, and a parasitic capacitance C3c between the stripe shape common electrode 141c and the scanning line 111. That is, $$Cc=C1bc+C1cd+C2c+C3c.$$

Similarly, the stripe-shaped common electrode 141e may have the on-state resistance Re and the parasitic capacitance Ce. The parasitic capacitance Ce of the stripe-shaped common electrode 141e may include a parasitic capacitance C1de between the stripe-shaped common electrode 141d and the stripe-shaped common electrode 141e, a parasitic capacitance C2e between the strip shaped common electrode 141e and the data line 121, and a parasitic capacitance C3e between the stripe shape common electrode 141e and the scanning line 111. That is, $$Ce=C1de+C2e+C3e.$$

When Rb=Rc=Rd, and Cb=Cc=Cd, the integrated touch control display panel according to the present disclosure may have more stable signal transmission. The distortion of the touch control signals due to different on-state resistances and different parasitic capacitances may be eliminated. Thus, the additional noise detection processing by the control circuit may be further reduced, the power consumption of the control circuit may be further reduced, and the processing speed of the control circuit may be further increased.

Further, when Ra=Rb=Rc=Rd=Re, each stripe-shaped common electrode may have equal on-state resistance and subsequently equal unit voltage drop in the signal transmission direction. Thus, the signal transmission may be more stable and free of distortion.

Further, each stripe-shaped common electrode 141 may be configured to support multiple pixel units 130. At least two stripe-shaped common electrodes 141 may be configured to support a same number of pixel units 130. These two stripe-shaped common electrodes 141 may have an equal distance to the adjacent stripe-shaped common electrodes 141. And these two stripe-shaped common electrodes 141 may have the equal edge length adjacent to other stripe-shaped common electrodes 141.

Referring to FIGS. 3-4, the stripe-shaped common electrodes 141b and 141d may be used for further illustration. These two stripe-shaped common electrodes 141b and 141d may be configured to support the equal number of pixel units 130. When the two stripe-shaped common electrodes 141b and 141d are configured to support the equal number of pixel units 130, the total length of the corresponding scanning lines 111 and data lines 121 may be equal. A capacitance may be calculated in the following equation:

$C=\in S/d$, where $\in$ is the dielectric constant, $S$ is the overlapping area of the plates, and $d$ is the distance between the plates.

For example, the parasitic capacitance C2 of the data line 121 may be used for illustration. The overlapping area S may be equal to the data line width times the data line length. d may be the distance between the data line 121 and the stripe-shaped common electrode 141. Controlled by the fabrication process, the data line 121 width is equal everywhere, and the distance between the data line 121 and the stripe-shaped common electrode 141 is equal everywhere. When the total lengths of the data lines supported by the corresponding stripe-shaped common electrode are equal, the data line parasitic capacitance C2 may be equal. Similarly, when the total lengths of the scanning lines supported by the corresponding stripe-shaped common electrode are equal, the scanning line parasitic capacitance C3 may be equal. That is, when the stripe-shaped common electrodes 141$b$ and 141$d$ are configured to support equal numbers of pixel units 130, C2$b$=C2$d$, and C3$b$=C3$d$.

At least two stripe-shaped common electrodes 141 may have an equal distance to the adjacent stripe-shaped common electrodes 141. And these two stripe-shaped common electrodes 141 may have the equal edge length adjacent to other stripe-shaped common electrodes 141. Referring to FIG. 4, the stripe-shaped common electrode 141$b$ may have a distance of Dab to the stripe-shaped common electrode 141$a$, and a distance of Dbc to the stripe-shaped common electrode 141$c$. The stripe-shaped common electrode 141$d$ may have a distance of Dcd to the stripe-shaped common electrode 141$c$, and a distance of Dde to the stripe-shaped common electrode 141$e$. Dab=Dbc, and Dcd=Dde.

Further, the stripe-shaped common electrodes 141$b$ and 141$d$ may extend the distances Lb and Ld, respectively, in the second direction Y. Lb=Ld. When Lb=Ld, C1$ab$=C1$bc$=C1$cd$=C1$de$. That is, the stripe-shaped common electrodes 141$b$ and 141$d$ may have an equal parasitic capacitance to the adjacent stripe-shaped common electrodes. The parasitic capacitance between adjacent stripe-shaped common electrodes is a lateral capacitance, which may be calculated in the following equation:

$C=k\in l/d$, where $k$ is a constant, $\in$ is the dielectric constant, $l$ is the length of the overlapping length of the plates, and $d$ is the distance between the plates.

When two parasitic capacitances have equal length 1 and equal distance d, the two parasitic capacitances may be equal. In this case, the two stripe-shaped electrodes 141$b$ and 141$d$ may have C1$ab$=C1$bc$=C1$cd$=C1$de$, C2$b$=C2$d$, and C3$b$=C3$d$. Thus, the signal transmission may be more stable and free of distortion.

Further, any two stripe-shaped common electrodes 141 may be configured to support an equal number of pixel units 130. Any two adjacent stripe-shaped common electrodes 141 may have equal distance in between. And these two stripe-shaped common electrodes 141 may have the equal edge length adjacent to other stripe-shaped common electrodes 141. In this case, the integrated touch control display panel may have stable signal transmission. The parasitic capacitances may have equal effect to each stripe-shaped common electrode. That is, each stripe-shaped common electrode may have equal signal phase shift. During the touch control phase, only the capacitance at the touch position may change. The capacitances in other positions may be stable and equal. Thus, the touch position may be calculated precisely and quickly.

In one embodiment, for example, the stripe-shaped common electrodes may be in a rectangular shape. When at least two rectangular shaped common electrodes 141 have an equal width in the first direction X, the corresponding rectangular shaped common electrodes 141 may be configured to support an equal number of pixel units 130. Further, in another embodiment, all rectangular shapes may be congruent, and the rectangular shaped common electrodes 141 may be configured to overlap with the data lines 121. That is, the orthogonal projection of the center line of the slit between two adjacent rectangular shaped common electrodes 141 on the substrate 100 may coincide with the orthogonal projection of the center line of the overlapped data line 121 on the substrate 100.

In certain other embodiments, the stripe-shaped common electrodes extending in the second direction Y may be in other shapes as long as at least two stripe-shaped common electrodes have an equal on-state resistance in the signal transmission direction, and an equal total parasitic capacitance to the scanning line, the data line, and the adjacent stripe-shaped common electrodes. As such, integrated touch control display panel with high precision touch position detection may be obtained.

Figure 5:
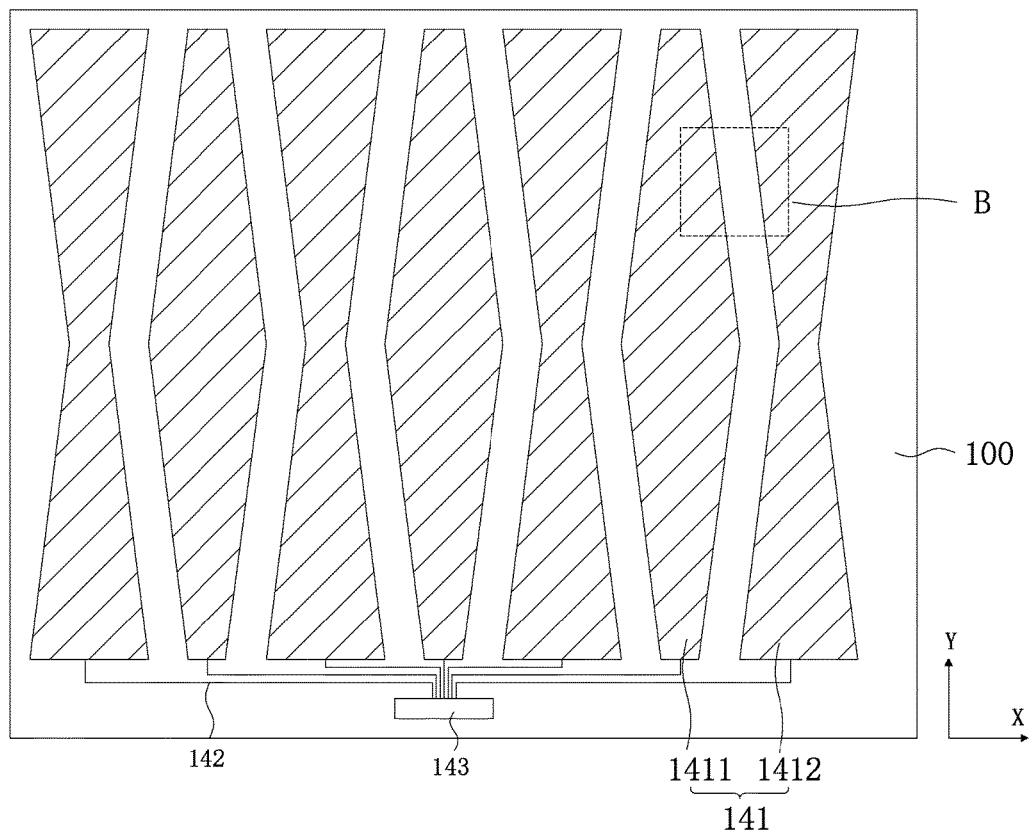
FIG. 5 illustrates a top view of the array substrate of another exemplary integrated touch control display panel according to the disclosed embodiments.
Figure 6:
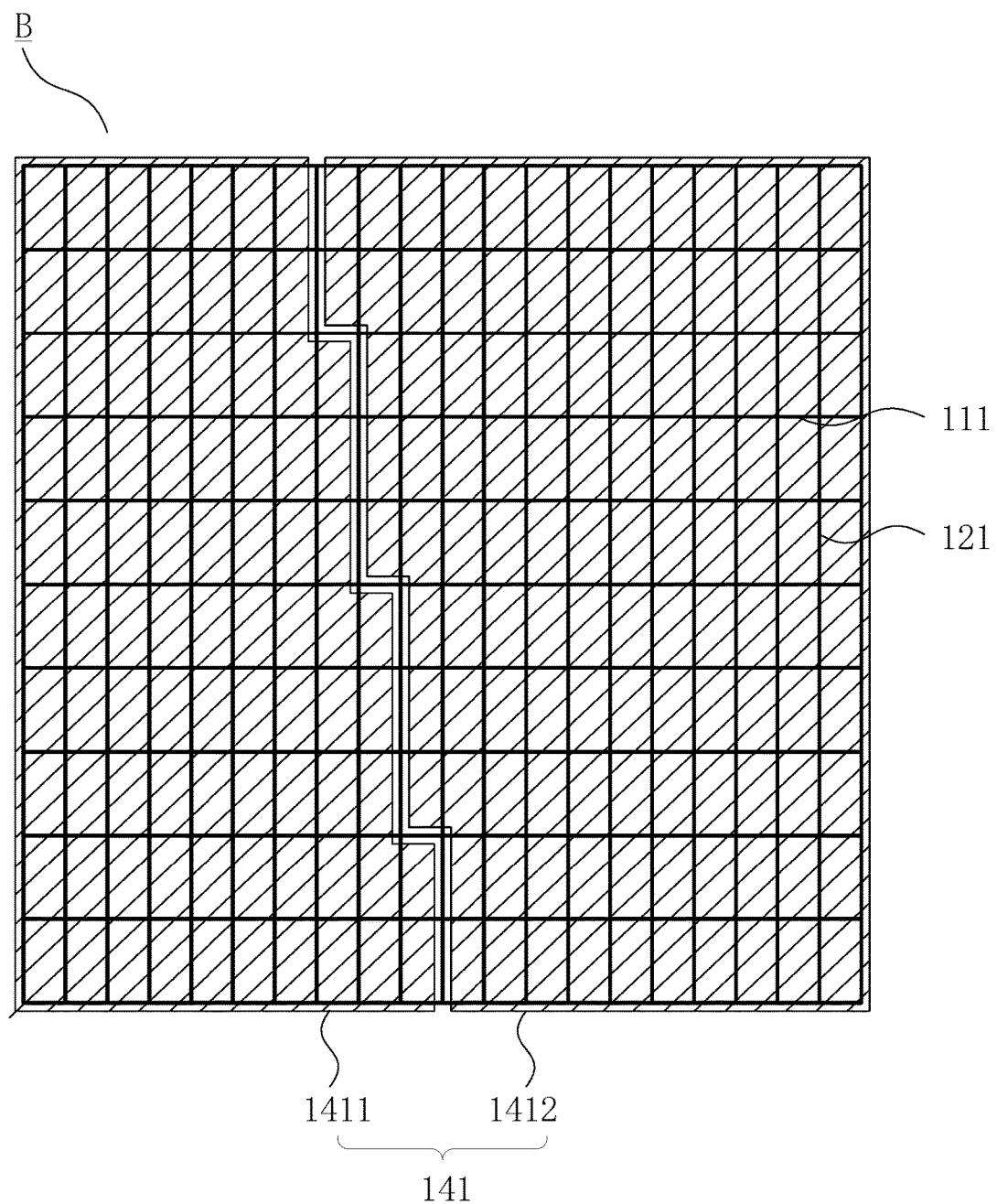
FIG. 6 illustrates a close-up view of B region in FIG. 5.

FIG. 5 illustrates a top view of the array substrate of another exemplary integrated touch control display panel according to the present disclosure. FIG. 6 illustrates a close-up view of B region in FIG. 5. Only the array substrate is shown in FIG. 5. Other structures of the integrated touch control display panel, such as the liquid crystal layer and the substrate configured facing toward the array substrate, may be the same as that of the integrated touch control display panels already described in certain other embodiments.

Referring to FIGS. 5-6, the integrated touch control display panel according to the present disclosure may include a substrate 100, a plurality of scanning lines 111 and a plurality of data lines 121 configured on the substrate 100. The plurality of the scanning lines 111 may extend in the first direction X. The plurality of the data lines 121 may extend in the second direction Y. Two adjacent scanning lines 111 and two adjacent data lines 121 may intersect to define a pixel unit. The first direction X is perpendicular to the second direction Y.

A plurality of stripe-shaped common electrodes 141 may be configured on the substrate 100. The plurality of the stripe-shaped common electrodes 141 may extend in the second direction Y, and may be sequentially arranged in the first direction X. During the touch control phase, the stripe-shaped common electrodes 141 may operate as touch control driving electrodes. At least two stripe-shaped common electrodes 141 may have an equal on-state resistance in the second direction Y, and an equal parasitic capacitance during the touch control phase. The parasitic capacitance may include a parasitic capacitance between the stripe-shaped common electrode 141 and the data line 121, a parasitic capacitance between the stripe-shaped common electrode 141 and the scanning line 111, and a parasitic capacitance between the stripe-shaped common electrode 141 and the adjacent stripe-shaped common electrodes 141.

Specifically, the integrated touch control display panel according to the present disclosure may include the plurality of the stripe-shaped common electrodes extending the second direction Y. The stripe-shaped common electrodes 141 may include spindle-shaped common electrodes 1411 and dumbbell-shaped common electrodes 1412. The spindle-shaped common electrodes 1411 and the dumbbell shaped common electrodes 1412 may be configured alternately, and may be connected to a common electrode control circuit 143 through common electrode connection lines 142.

During the image display phase, the common electrode control circuit 143 may supply a common voltage to all common electrodes. Between the stripe-shaped common electrodes 141 and the pixel electrodes may form electric field to control the rotation of the liquid crystals to display images. During the touch control phase, the common electrode control circuit 143 may supply touch control driving signals to all stripe-shaped common electrodes 141 sequentially. The stripe-shaped common electrodes 141 may operate as the touch control driving electrodes.

In one embodiment, though in different shapes, the spindle-shaped common electrodes 1411 and the dumbbell-shaped common electrodes 1412 may occupy same area. Each common electrode may be formed by attaching two congruent isosceles trapezoids together. The resistance may be calculated by the formula R=ρL/S, wherein, R is the resistance, ρ is the resistivity, L is the length in the conducting direction, and S is the cross-section area. Because the common electrode has varying cross-section area, the common electrode resistance may be calculated by the formula R=∫ρ/S(dL). In the conducting direction, the common electrode may be divided into sections with a length dL. The common electrode resistance may be the summation of the resistances of the section with the length dL. Because each stripe-shaped common electrode 141 is formed by attaching two congruent isosceles trapezoids together, the spindle-shaped common electrode 1411 and the dumbbell-shaped common electrode 1412 may have an equal on-state resistance in the second direction Y.

In one embodiment, although the stripe-shaped common electrodes 141 extend in the second direction Y, the side edges of the stripe-shaped common electrodes 141 extending in the second direction Y may be bent. Referring to FIGS. 5-6, on the macro level, the stripe-shaped common electrodes 141 may have inclined edges extending the in the second direction Y. But, on the micro level, the stripe-shaped common electrodes 141 may have bent or zigzag edges alternately extending in the first direction X and second direction Y. That is, the bent or zigzag edges may be configured to trace the data lines and the scanning lines accordingly. The center lines of the slits between any two adjacent stripe-shaped common electrodes 1411 or 1412 may have orthogonal projections on the substrate 100 that coincide with the orthogonal projections of the center lines of the data lines 121 or the scanning lines 111 on the substrate 100.

Because the spindle-shaped common electrodes 1411 and the dumbbell-shaped common electrodes 1412 occupy the same area, both may support an equal number of pixel units. At least two stripe-shaped common electrodes 141 may have the same parasitic capacitance between the stripe-shaped common electrodes 141 and the scanning lines 111 or the data lines 121. Because the slits between any two adjacent stripe-shaped common electrodes 141 are identical, the edges may have the equal length, and the parasitic capacitance between these two adjacent stripe-shaped common electrodes 141 may be the same.

At least two stripe-shaped common electrodes 141 may have the same on-state resistance in the second direction Y and the same parasitic capacitance during the touch control phase. The parasitic capacitance may include the parasitic capacitance between the stripe-shaped common electrode 141 and the data line 121, the parasitic capacitance between the stripe-shaped common electrode 141 and the scanning line 111, and the parasitic capacitance between the stripe-shaped common electrode 141 and the adjacent stripe-shaped common electrodes 141.

Further, other than the two outermost stripe-shaped common electrodes 141, other stripe-shaped common electrodes 141 may have the equal on-state resistance in the second direction Y and the equal parasitic capacitance during the touch control phase.

The integrated touch control display panel according to the present disclosure may include at least two stripe-shaped common electrodes configured to have an equal on-state resistance in the signal transmission direction and an equal aggregated parasitic capacitance. As a result, the touch control driving signals may incur the equal amount of the signal loss and signal phase shift on the stripe-shaped common electrodes to reduce the amount of the calculation by the noise detection process module of the control circuit. Thus, the power consumption of the control circuit may be reduced and the processing speed may be increased.

In one embodiment, only the spindle-shaped common electrodes and dumbbell-shaped common electrodes are used for illustration purpose. In certain other embodiments, other shapes may be used. For example, triangle-shaped common electrodes may be used extending in the second direction. As long as at least two common electrodes have an equal on-state resistance in the second direction and an equal aggregated parasitic capacitance, the integrated touch control display panel may have desirable touch position detection precision. When calculating the aggregated parasitic capacitance, as long as the summation of various parasitic capacitances is the same, there is no need to have each and every parasitic capacitance equal. When adjacent common electrodes have varying distances between them, the integral method may be used to calculate the aggregated parasitic capacitance.

Figure 7:
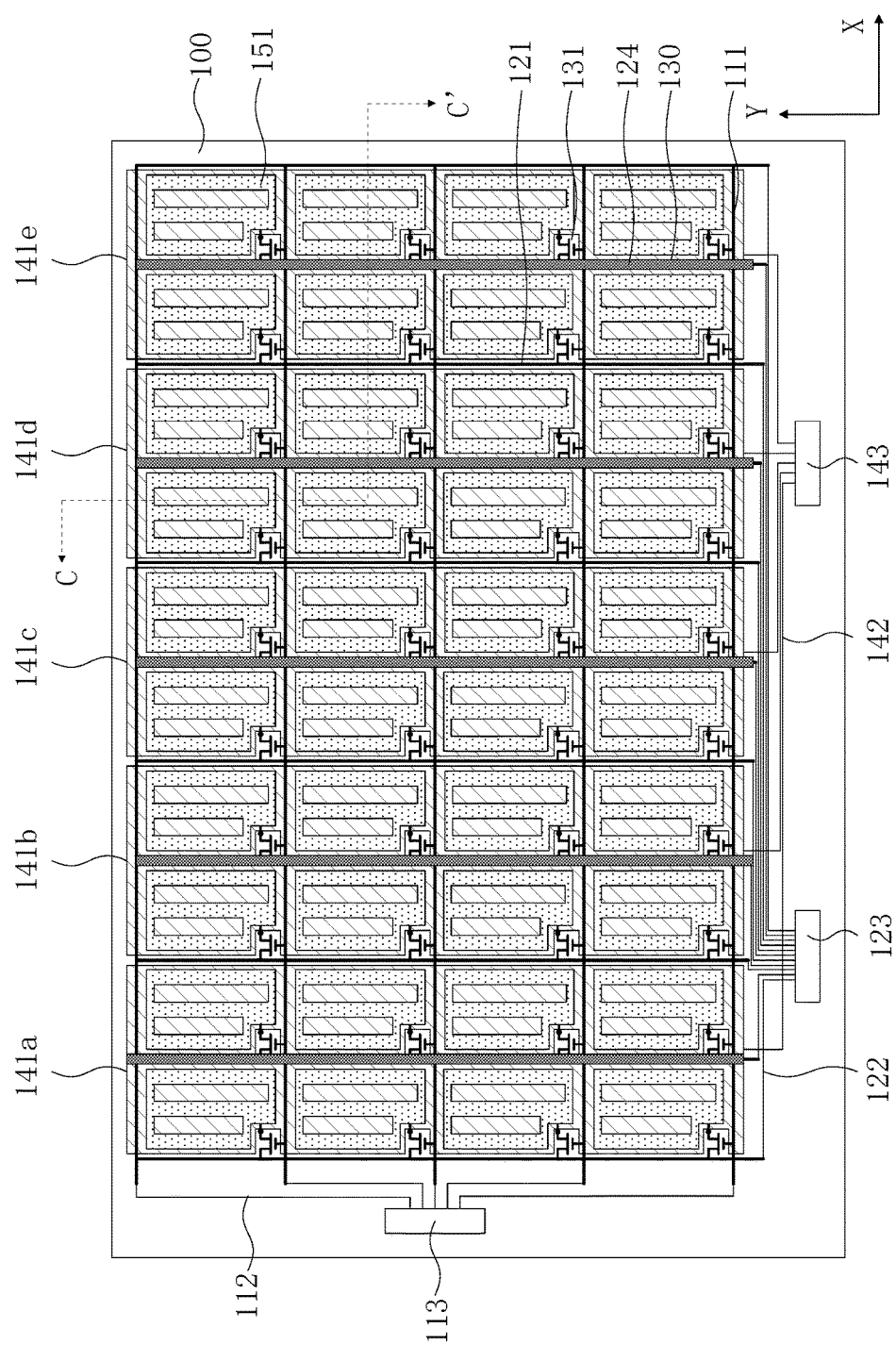
FIG. 7 illustrates a top view of the array substrate of another exemplary integrated touch control display panel according to the disclosed embodiments.
Figure 8:
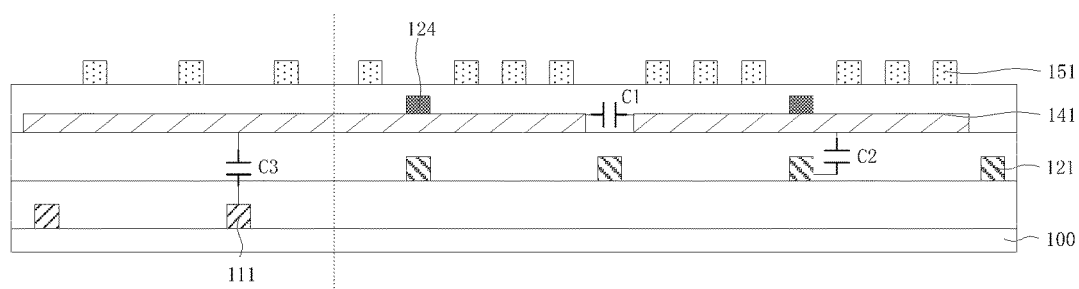
FIG. 8 illustrates a cross-sectional view along the CC' line in FIG. 7.

FIG. 7 illustrates a top view of the array substrate of another exemplary integrated touch control display panel according to the present disclosure. FIG. 8 illustrates a cross-sectional view along the CC' line in FIG. 7. The integrated touch control display panel according to the present disclosure may include a substrate 100, a plurality of scanning lines 111 and a plurality of data lines 121 configured on the substrate 100. The plurality of the scanning lines 111 may extend in the first direction X. The plurality of the data lines may extend in the second direction Y. Two adjacent scanning lines 111 and two adjacent data lines 121 may intersect to define a pixel unit. The first direction X is perpendicular to the second direction Y.

The plurality of the stripe-shaped common electrodes 141 may extend in the second direction Y and may be sequentially arranged in the first direction X. During the touch control phase, the strip-shaped common electrodes 141 may operate as touch control driving electrodes. At least two stripe-shaped common electrodes 141 may have an equal on-state resistance in the second direction Y and an equal aggregated parasitic capacitance during the touch control phase. The aggregated parasitic capacitance may include a parasitic capacitance C1 between the stripe-shaped common electrode 141 and the adjacent stripe-shaped common electrodes 141, a parasitic capacitance C2 between the stripe-shaped common electrode 141 and the data line 121, and a parasitic capacitance C3 between the stripe-shaped common electrode 141 and the scanning line 111.

Specifically, the array substrate of the integrated touch control display panel according to the present disclosure may include an additional metal wiring layer, compared to the array substrate shown in FIG. 2. The metal wiring layer may include a plurality of metal wirings 124 that connect the stripe-shaped common electrodes 141. The metal wirings 124 that connect to different strip-shaped common electrodes 141 may be insulated from each other. The metal wirings 124 that connect to at least two stripe-shaped common electrodes 141 having the equal on-state resistance in the second direction Y may have an equal resistance. Other than the metal wiring layer 124, the array substrate of the integrated touch control display panel according to the present disclosure may have the same other structures as the array substrate shown in FIG. 2.

Further, in one embodiment, the stripe-shaped common electrodes 141b and 141d may be used for illustration. These two stripe-shaped common electrodes 141b and 141d may have the equal on-state resistance in the second direction Y and the equal aggregated parasitic capacitance during the touch control phase. The two stripe-shaped common electrodes 141b and 141d may be configured to connect to the metal wirings 124 that are insulated from the metal wirings connected to the other stripe-shaped common electrodes 141.

Because the stripe-shaped common electrodes 141 are often made of indium tin oxide (ITO) or other appropriate transparent metal oxide material, the resistances may be high. The metal wirings 124 may be configured to reduce the signal transmission resistances and avoid excessive voltage drops to make the touch position detection more precisely. Further, the metal wirings 124 connected to the two stripe-shaped common electrodes 141b and 141d may have the equal on-state resistance in the second direction Y. Thus, a uniform touch position detection performance on the touch control display panel may be achieved.

Further, the metal wirings 124 may extend in the second direction Y. The metal wirings 124 and the data lines 121 may have overlapping orthogonal projections on the substrate 100. Preferably, the orthogonal projections of the center lines of the metal wirings 124 on the substrate 100 may coincide with the orthogonal projections of the center lines of the data lines 121 on the substrate 100. Thus, such configuration may reduce the on-state resistances of the stripe-shaped common electrodes 141 without reducing the pixel unit aperture.

Further, the metal wirings 124 may be directly connected to the stripe-shaped common electrodes 141 or indirectly connected to the stripe-shaped common electrodes 141 through the through-holes. The metal wirings may be located on the far side of the substrate 100 away from the stripe-shaped common electrodes 141 or on the near side of the substrate 100 close to the stripe-shaped common electrodes 141.

The integrated touch control display panel according to the present disclosure may include at least two stripe-shaped common electrodes configured to have an equal on-state resistance in the signal transmission direction and an equal aggregated parasitic capacitance. As a result, the touch control driving signals may incur the equal amount of the signal loss and signal phase shift on the stripe-shaped common electrodes to reduce the amount of the calculation by the noise detection process module of the control circuit. Thus, the power consumption of the control circuit may be reduced and the processing speed may be increased.

Figure 9:
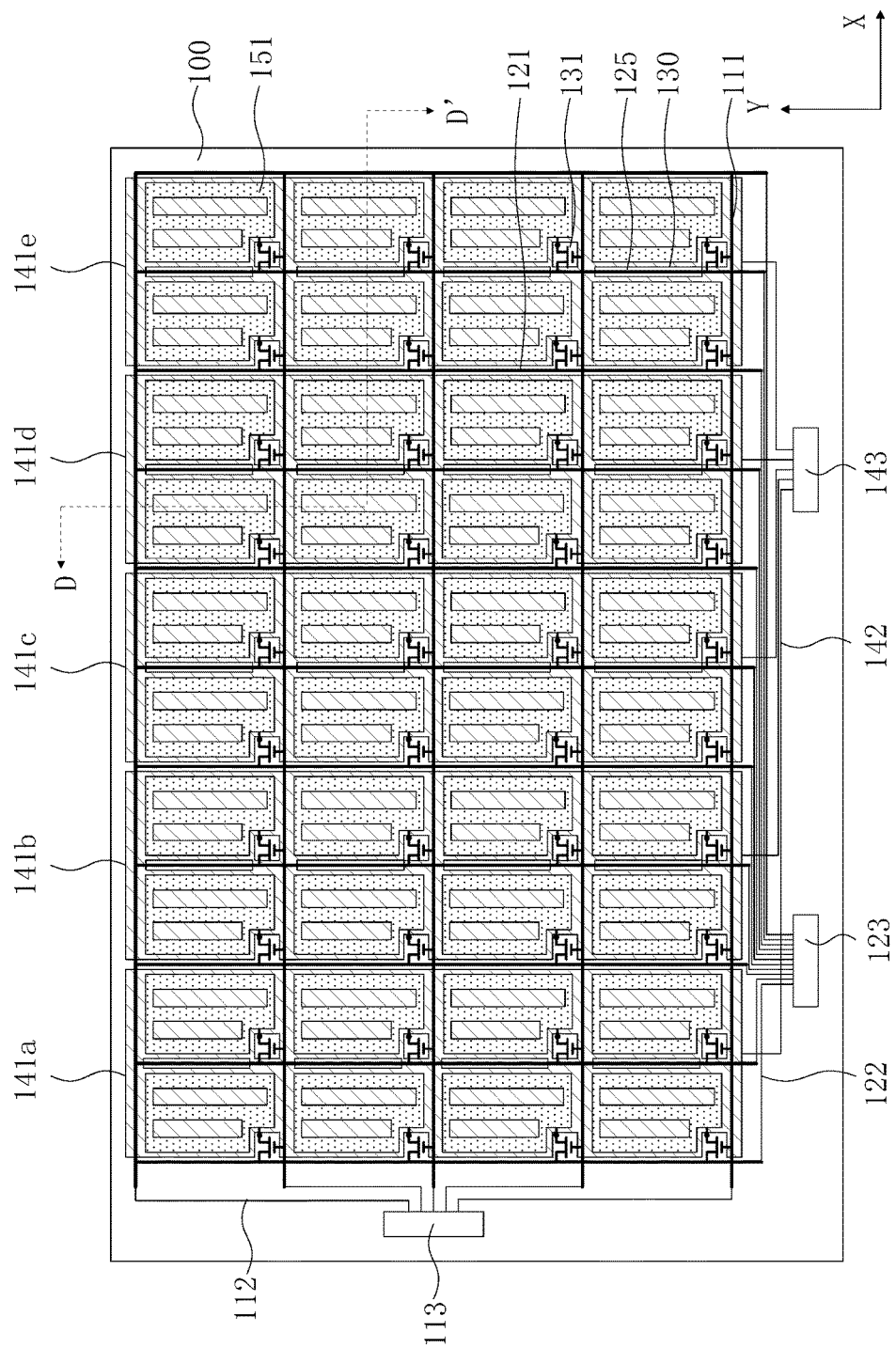
FIG. 9 illustrates a top view of the array substrate of another exemplary integrated touch control display panel according to the disclosed embodiments.
Figure 10:
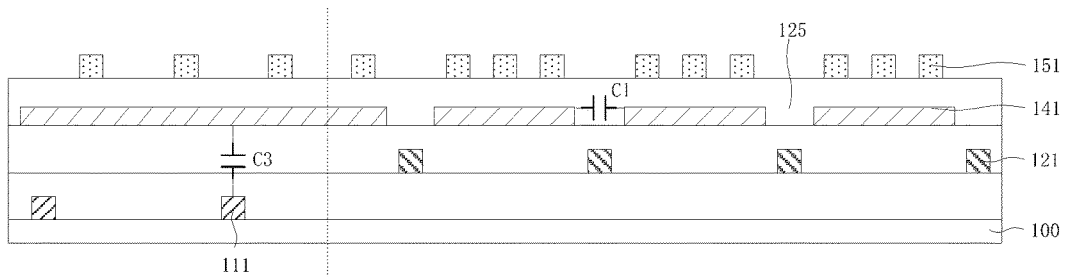
FIG. 10 illustrates a cross-sectional view along the DD' line in FIG. 9.

FIG. 9 illustrates a top view of the array substrate of another exemplary integrated touch control display panel according to the present disclosure. FIG. 10 illustrates a cross-sectional view along the DD' line in FIG. 9. Only an array substrate of the integrated touch control display panel is shown in FIG. 9. Other structures, such as a liquid crystal layer and a substrate configured facing toward the array substrate 100 may be the same as those previously described.

Referring to FIGS. 9-10, the integrated touch control display panel according to the present disclosure may include an array substrate 100, a plurality of the canning lines 111 and a plurality of data lines 121 configured on the array substrate 100. The plurality of the scanning lines 111 may extend in the first direction X. The plurality of the data lines 121 may extend in the second direction Y. Two adjacent scanning lines 111 and two adjacent data lines 121 may intersect to define a pixel unit. The first direction X is perpendicular to the second direction Y.

The plurality of the stripe-shaped common electrodes 141 may extend in the second direction Y and may be sequentially arranged in the first direction X. During the touch control phase, the stripe-shaped common electrodes 141 may operate as touch control driving electrodes. At least two stripe-shaped common electrodes 141 may have an equal on-state resistance in the second direction Y and an equal aggregated parasitic capacitance during the touch control phase. The aggregated parasitic capacitance may include a parasitic capacitance C1 between the stripe-shaped common electrode 141 and the adjacent strip-shaped common electrodes 141, a parasitic capacitance C2 between the stripe-shaped common electrode 141 and the data line 121, and a parasitic capacitance C3 between the stripe-shaped common electrode 141 and the scanning line 111.

Specifically, compared to the array substrate shown in FIG. 2, the array substrate of the integrated touch control display panel according to the present disclosure may include a plurality of openings 125 configured on the stripe-shaped common electrodes 141. The openings 125 may be configured to correspond to the data lines 121. The openings may have orthogonal projections on the substrate 100 coincide with the orthogonal projections of the data lines 121 on the substrate 100. The other structures of the integrated touch control display panel according to the present disclosure may be the same as those shown in FIG. 2.

The openings 125 configured on the integrated touch control display panel according the present disclosure may reduce the parasitic capacitances between the stripe-shaped common electrodes 141 and the data lines 121. The parasitic capacitance reduction may be desired for the uniform signal transmission and the improvement of the signal detection precision. Specifically, the openings may have a width equal to the width of the slits between adjacent stripe-shaped common electrodes 141. Such configuration may make the patterns between the stripe-shaped common electrodes 141 and the pixel electrodes more uniform, and may subsequently make the electric fields between the stripe-shaped common electrodes 141 and the pixel electrodes more uniform. Thus, uneven display may be minimized.

The integrated touch control display panel according to the present disclosure may include at least two stripe-shaped common electrodes configured to have an equal on-state resistance in the signal transmission direction and an equal aggregated parasitic capacitance. As a result, the touch control driving signals may incur the equal amount of the signal loss and signal phase shift on the stripe-shaped common electrodes to reduce the amount of the calculation by the noise detection process module of the control circuit. Thus, the power consumption of the control circuit may be reduced and the processing speed may be increased.

Figure 11:
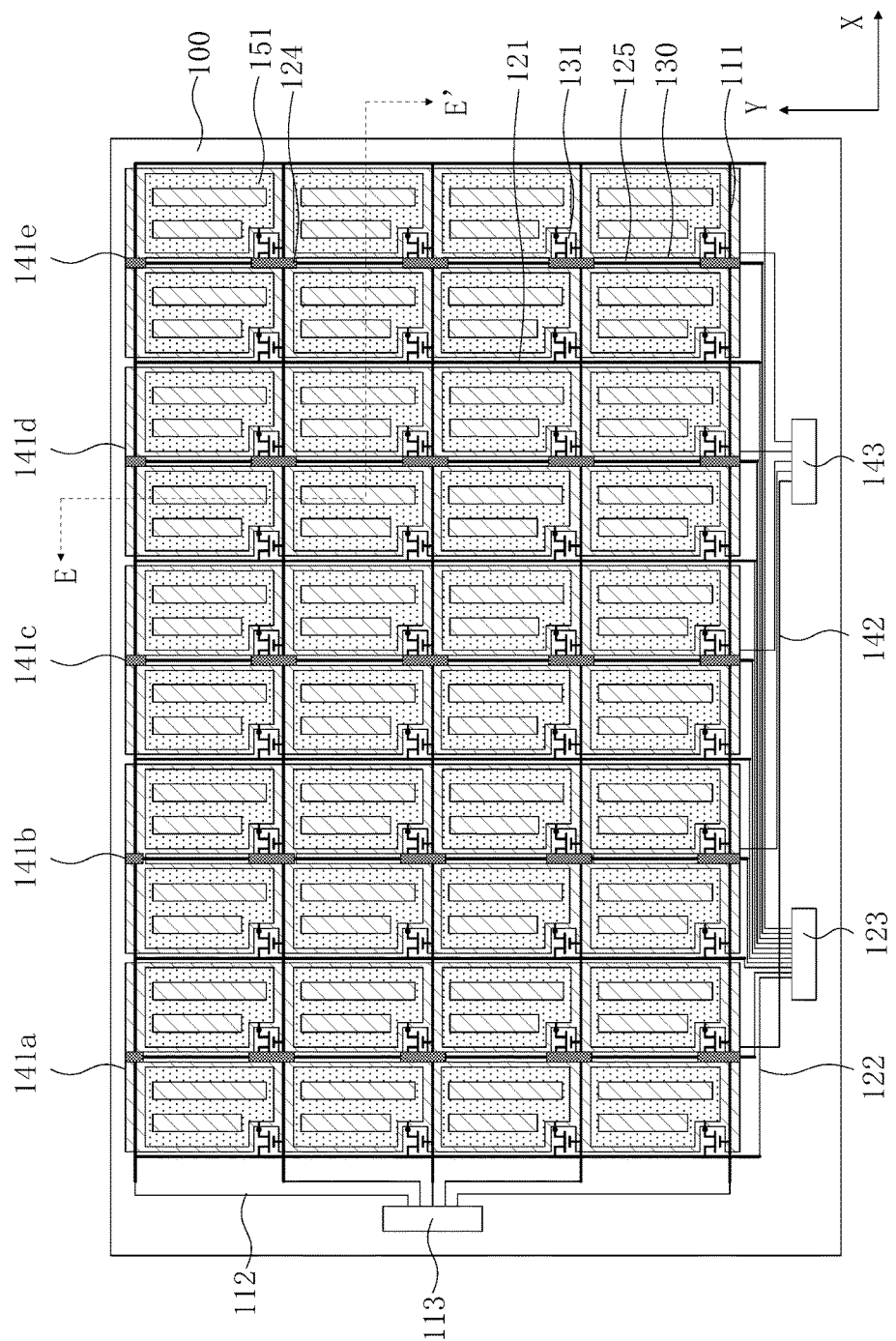
FIG. 11 illustrates a top view of the array substrate of another exemplary integrated touch control display panel according to the disclosed embodiments.

FIG. 11 illustrates a top view of the array substrate of another exemplary integrated touch control display panel according to the present disclosure. Referring to FIG. 11, a cross-sectional view along the EE' line may be the same as the cross-sectional view along the DD' line as shown in FIG. 10. Only an array substrate of the integrated touch control display panel is shown in FIG. 11. Other structures, such as a liquid crystal layer and a substrate configured facing toward the array substrate 100 may be the same as those previously described.

Referring to FIG. 11, the integrated touch control display panel according to the present disclosure may include an array substrate 100, a plurality of the canning lines 111 and a plurality of data lines 121 configured on the array substrate 100. The plurality of the scanning lines 111 may extend in the first direction X. The plurality of the data lines 121 may extend in the second direction Y. Two adjacent scanning lines 111 and two adjacent data lines 121 may intersect to define a pixel unit. The first direction X is perpendicular to the second direction Y.

The plurality of the stripe-shaped common electrodes 141 may extend in the second direction Y and may be sequentially arranged in the first direction X. during the touch control phase, the stripe-shaped common electrodes 141 may operate as touch control driving electrodes. At least two stripe-shaped common electrodes 141 may have an equal on-state resistance in the second direction Y and an equal aggregated parasitic capacitance during the touch control phase. The aggregated parasitic capacitance may include a parasitic capacitance C1 between the stripe-shaped common electrode 141 and the adjacent strip-shaped common electrodes 141, a parasitic capacitance C2 between the stripe-shaped common electrode 141 and the data line 121, and a parasitic capacitance C3 between the stripe-shaped common electrode 141 and the scanning line 111.

Specifically, compared to the array substrate shown in FIGS. 7 and 9, the array substrate of the integrated touch control display panel according to the present disclosure may include a plurality of metal wirings 124 and a plurality of openings 125. The metal wirings 124 that connect the stripe-shaped common electrodes 141 may include a plurality of metal sections that extends in the second direction Y and is configured alternately with the plurality of the openings 125.

The metal wirings 124 that connect to different strip-shaped common electrodes 141 may be insulated from each other. The metal wirings 124 that connect to at least two stripe-shaped common electrodes 141 having the equal on-state resistance in the second direction Y may have an equal resistance.

The openings 125 may be configured on the stripe-shaped common electrodes 141 to correspond to the data lines 121. The openings may have orthogonal projections on the substrate 100 coincide with the orthogonal projections of the data lines 121 on the substrate 100. The openings 125 may reduce the parasitic capacitances between the stripe-shaped common electrodes 141 and the data lines 121. The parasitic capacitance reduction may be desired for the uniform signal transmission and the improvement of the signal detection precision. Specifically, the openings may have a width equal to the width of the slits between adjacent stripe-shaped common electrodes 141.

The other structures of the integrated touch control display panel according to the present disclosure may be the same as those shown in FIG. 2. Such configuration may reduce the parasitic capacitances, the common electrode 141 on-state resistances in the second direction Y, the amount of calculation by the noise detection process module of the control circuit, and the power consumption of the control circuit. Thus, the processing speed may be improved.

Figure 12:
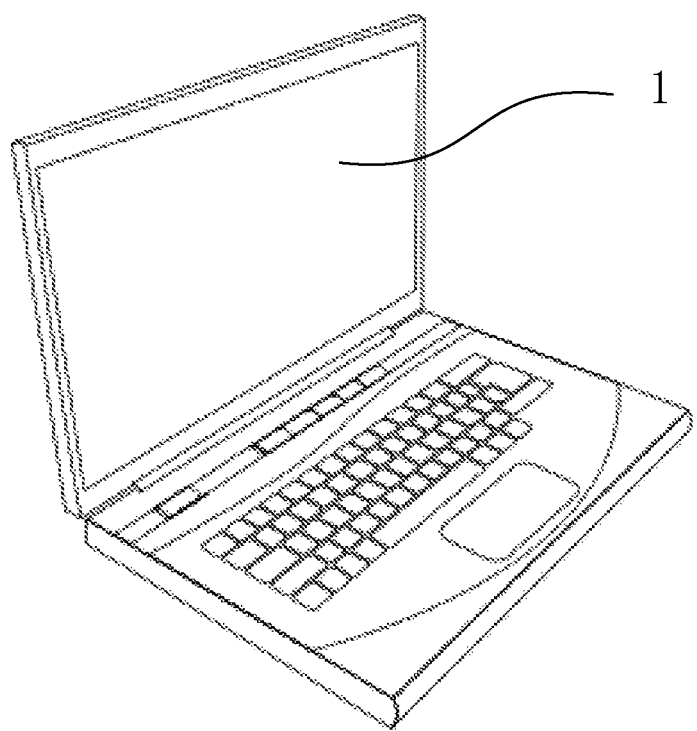
FIG. 12 illustrates a schematic view of an exemplary touch display device according to the disclosed embodiments.

FIG. 12 illustrates a schematic view of an exemplary touch display device according to the present disclosure. Referring to FIG. 12, the touch display device may include an integrated touch control display panel 1 according to the present disclosure. Specifically, the integrated touch control display panel 1 may include a substrate, a plurality of scanning lines and a plurality of data lines configured on the substrate. The scanning lines may extend in a first direction. The data lines may extend in a second direction. Two adjacent scanning lines and two adjacent data lines may intersect to define a pixel unit. The first direction may be perpendicular to the second direction.

The plurality of the stripe-shaped common electrodes may extend in the second direction and may be sequentially arranged in the first direction. During the touch control phase, the stripe-shaped common electrodes may operate as touch control driving electrodes. At least two stripe-shaped common electrodes may have an equal on-state resistance in the second direction and an equal aggregated parasitic capacitance during the touch control phase. The aggregated parasitic capacitance may include a parasitic capacitance between the stripe-shaped common electrode and the adjacent strip-shaped common electrodes, a parasitic capacitance between the stripe-shaped common electrode and the data line, and a parasitic capacitance between the stripe-shaped common electrode and the scanning line.

The integrated touch control display panel according to the present disclosure may include at least two stripe-shaped common electrodes configured to have an equal on-state resistance in the signal transmission direction and an equal aggregated parasitic capacitance. As a result, the touch control driving signals may incur the equal amount of the signal loss and signal phase shift on the stripe-shaped common electrodes to reduce the amount of the calculation by the noise detection process module of the control circuit. Thus, the power consumption of the control circuit may be reduced and the processing speed may be increased.

Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An integrated touch control display panel, comprising:
   a plurality of stripe-shaped common electrodes sequentially arranged in a first direction and extending in a second direction intersecting with the first direction, wherein:
      the stripe-shaped common electrodes operate as touch control driving electrodes during a touch control phase, and
      at least two stripe-shaped common electrodes have an equal on-state resistance in the second direction and an equal aggregated parasitic capacitance during the touch control phase; and
   a metal wiring layer, wherein:
      the metal wiring layer includes a plurality of metal wirings connecting the stripe-shaped common electrodes,
      the metal wirings connecting to different stripe-shaped common electrodes are insulated from each other, and
      the metal wirings connecting to at least two stripe-shape common electrodes that have the equal on-state resistance in the second direction have an equal on-state resistance in the second direction.

2. The integrated touch control display panel of claim 1, further including:
   a plurality of scanning lines extending in the first direction; and
   a plurality of data lines extending in the second direction perpendicular to the first direction, wherein:
      two adjacent scanning lines and two adjacent data lines intersect to define a pixel unit; and the aggregated parasitic capacitance includes a parasitic capacitance between the stripe-shaped common electrode and the adjacent stripe-shaped common electrodes, a parasitic capacitance between the stripe-shaped common electrode and the data line, and a parasitic capacitance between the stripe-shaped common electrode and the scanning line.

3. The integrated touch control display panel of claim 1, wherein:
the stripe-shaped common electrodes, except for the two outermost ones, have the equal on-state resistance in the second direction and the equal aggregated parasitic capacitance during the touch control phase.

4. The integrated touch control display panel of claim 2, wherein:
each stripe-shaped common electrode is configured to support a plurality of pixel units; and
at least two stripe-shaped common electrodes support an equal number of the pixel units, have an equal distance to the adjacent stripe-shaped common electrodes, and have an equal edge length extending in the second direction.

5. The integrated touch control display panel of claim 4, wherein:
any two stripe-shaped common electrodes support an equal number of the pixel units, have an equal distance to the adjacent stripe-shaped common electrodes, and have an equal edge length adjacent to other stripe-shaped common electrodes.

6. The integrated touch control display panel of claim 5, wherein:
the stripe-shaped common electrodes have bent or zigzag edges extending in the second direction; and
the bent or zigzag edges include a plurality of small sections extending in the first and second directions.

7. The integrated touch control display panel of claim 4, wherein:
the stripe-shaped common electrodes are in a rectangular shape; and
at least two rectangular-shaped common electrodes have an equal width in the first direction.

8. The integrated touch control display panel of claim 1, wherein:
the metal wirings extend in the second direction; and
orthogonal projections of the metal wirings on the substrate coincide with orthogonal projections of the data lines on the substrate.

9. The integrated touch control display panel of claim 1, wherein:
a plurality of openings are configured on the stripe-shaped common electrodes to trace the data lines; and
orthogonal projections of the openings on the substrate coincide with orthogonal projections of the data lines on the substrate.

10. The integrated touch control display panel of claim 9, wherein:
the metal wirings include a plurality of metal wiring sections extending in the second direction; and
the metal wiring sections and the openings are configured alternately in the second direction.

11. A touch display device including an integrated touch control display panel, the integrated touch control display panel comprising:
a plurality of stripe-shaped common electrodes sequentially arranged in a first direction and extending in a second direction intersecting with the first direction, wherein:
the stripe-shaped common electrodes operate as touch control driving electrodes during a touch control phase, and
at least two stripe-shaped common electrodes have an equal on-state resistance in the second direction and an equal aggregated parasitic capacitance during the touch control phase; and
a metal wiring layer, wherein:
the metal wiring layer includes a plurality of metal wirings connecting the stripe-shaped common electrodes,
the metal wirings connecting to different stripe-shaped common electrodes are insulated from each other, and
the metal wirings connecting to at least two stripe-shape common electrodes that have the equal on-state resistance in the second direction have an equal on-state resistance in the second direction.

12. The touch display device of claim 11, further including:
a plurality of scanning lines extending in the first direction; and
a plurality of data lines extending in the second direction perpendicular to the first direction, wherein:
two adjacent scanning lines and two adjacent data lines intersect to define a pixel unit; and
the aggregated parasitic capacitance includes a parasitic capacitance between the stripe-shaped common electrode and the adjacent stripe-shaped common electrodes, a parasitic capacitance between the stripe-shaped common electrode and the data line, and a parasitic capacitance between the stripe-shaped common electrode and the scanning line.

13. An integrated touch control display panel, comprising:
a plurality of stripe-shaped common electrodes sequentially arranged in a first direction and extending in a second direction intersecting with the first direction;
a plurality of scanning lines extending in the first direction; and
a plurality of data lines extending in the second direction perpendicular to the first direction,
wherein:
the stripe-shaped common electrodes operate as touch control driving electrodes during a touch control phase,
at least two stripe-shaped common electrodes have an equal on-state resistance in the second direction and an equal aggregated parasitic capacitance during the touch control phase,
two adjacent scanning lines and two adjacent data lines intersect to define a pixel unit,
the aggregated parasitic capacitance includes a parasitic capacitance between the stripe-shaped common electrode and the adjacent stripe-shaped common electrodes, a parasitic capacitance between the stripe-shaped common electrode and the data line, and a parasitic capacitance between the stripe-shaped common electrode and the scanning line,
each stripe-shaped common electrode is configured to support a plurality of pixel units,
at least two stripe-shaped common electrodes support an equal number of the pixel units, have an equal distance to the adjacent stripe-shaped common electrodes, and have an equal edge length extending in the second direction, and
any two stripe-shaped common electrodes support an equal number of the pixel units, have an equal distance to the adjacent stripe-shaped common electrodes, and have an equal edge length adjacent to other stripe-shaped common electrodes, the stripe-shaped common electrodes have bent or zigzag edges extending in the second direction, and the bent or zigzag edges include a plurality of small sections extending in the first and second directions.

* * * * *